US012315687B2

(12) United States Patent
Zhang et al.

(10) Patent No.: US 12,315,687 B2
(45) Date of Patent: May 27, 2025

(54) ROTARY SWITCH

(71) Applicants: Huawei Digital Power Technologies Co., Ltd., Shenzhen (CN); Shanghai Liangxin Electrical Co., Ltd., Shanghai (CN)

(72) Inventors: Xiufeng Zhang, Dongguan (CN); Jian Shi, Shanghai (CN); Hao Wang, Shanghai (CN); Jiang Zhang, Shanghai (CN); Xiaokang Tian, Shenzhen (CN)

(73) Assignees: Huawei Digital Power Technologies Co., Ltd., Shenzhen (CN); Shanghai Liangxin Electrical Co., Ltd., Shanghai (CN)

( * ) Notice: Subject to any disclaimer, the term of this patent is extended or adjusted under 35 U.S.C. 154(b) by 131 days.

(21) Appl. No.: 18/157,672

(22) Filed: Jan. 20, 2023

(65) Prior Publication Data

US 2023/0154702 A1 May 18, 2023

Related U.S. Application Data

(63) Continuation of application No. PCT/CN2021/100161, filed on Jun. 15, 2021.

(30) Foreign Application Priority Data

Jul. 20, 2020 (CN) ........................ 202010703233.3

(51) Int. Cl.
*H01H 19/14* (2006.01)
*H01H 3/38* (2006.01)
(Continued)

(52) U.S. Cl.
CPC .............. *H01H 19/14* (2013.01); *H01H 3/38* (2013.01); *H01H 71/12* (2013.01); *H01H 71/56* (2013.01); *H01H 2019/008* (2013.01)

(58) Field of Classification Search
CPC .......... H01H 19/14; H01H 3/38; H01H 71/12; H01H 71/56; H01H 2019/008;
(Continued)

(56) References Cited

U.S. PATENT DOCUMENTS 4,481,492 A 11/1984 Borne et al.
7,733,199 B2 6/2010 Dauer et al.
(Continued)

FOREIGN PATENT DOCUMENTS

CN 200959299 Y 10/2007
CN 107045958 A 8/2017
(Continued)

*Primary Examiner* — Lheiren Mae A Caroc
(74) *Attorney, Agent, or Firm* — Leydig, Voit & Mayer, Ltd

(57) ABSTRACT

A rotary switch includes an operating mechanism, an on-off apparatus, and a tripping component. The operating mechanism includes an energy storage component and a drive component. The drive component is in driving connection with the energy storage component and the on-off apparatus. The energy storage component includes a latch and an energy storage spring that cooperates with the latch. The energy storage spring can be connected to the latch and the drive component in a snap-fit manner, such that rotation of the drive component stores energy in the energy storage component. Rotation of the drive component also drives the on-off apparatus to an on position. The latch the tripping component interact such that the latch locks or unlocks the energy storage spring.

20 Claims, 11 Drawing Sheets

(51) Int. Cl.

| | |
|---|---|
| ***H01H 71/12*** | (2006.01) |
| ***H01H 71/56*** | (2006.01) |
| *H01H 19/00* | (2006.01) |

(58) Field of Classification Search

CPC ................. H01H 3/3042; H01H 19/24; H01H 2003/3089; H01H 19/64; H01H 19/10; H01H 71/10; H01H 1/36; H01H 1/2041; H01H 3/00; H01H 3/02; H01H 3/30; H01H 3/3005; H01H 3/3015; H01H 3/3031; H01H 3/32; H01H 3/42; H01H 3/08

See application file for complete search history.

(56) References Cited

U.S. PATENT DOCUMENTS

2023/0121284 A1* 4/2023 Zhang .................... H01H 83/20 200/336
2023/0154703 A1* 5/2023 Shi ......................... H01H 71/56 200/400

FOREIGN PATENT DOCUMENTS

| | | | |
|---|---|---|---|
| CN | 108878224 | A | 11/2018 |
| CN | 209401499 | U | 9/2019 |
| CN | 110911186 | A | 3/2020 |
| CN | 110911187 | A | 3/2020 |
| CN | 211376497 | U | 8/2020 |
| CN | 111863496 | A | 10/2020 |
| CN | 112750643 | A | 5/2021 |

* cited by examiner

ROTARY SWITCH

CROSS-REFERENCE TO RELATED APPLICATIONS

This application is a continuation of International Application No. PCT/CN2021/100161, filed on Jun. 15, 2021, which claims priority to Chinese Patent Application No. 202010703233.3, filed on Jul. 20, 2020. The disclosures of the aforementioned applications are hereby incorporated by reference in their entireties.

TECHNICAL FIELD

Embodiment of the present application relate to the field of electrical technologies, and in particular, to a rotary switch.

BACKGROUND

A switch is an element that can open a circuit, interrupt current, or cause the current to flow to another circuit. In terms of history of development, the switch has evolved, from an original knife switch that needs to be manually operated, to a current intelligent switch applied in various large electrical control devices. Functions of the switch are increasing, and safety of the switch is increasingly high.

With development of technologies, the switch has been widely applied in an increasing quantity of control fields or automation fields, such as electric power, machinery, mining, metallurgy, petrochemical, construction, shipbuilding, nuclear power generation, and new energy power generation. In a use process, there are often emergencies that need to cut off a power supply, but there is no professional technician on site. Other people cannot accurately find a location and cut off the power supply, and cannot eliminate a potential safety risk in time.

Currently, to cut off the power supply in time, an electric motor is usually added in a position of an operating handle of the switch to implement a remote switching function, and the rotary switch is driven by the electric motor to cut off the circuit. However, usually, when an emergency occurs, the power supply cannot continuously supply power to the electric motor, which affects normal turn-off of the switch.

SUMMARY

The present application aims to provide a rotary switch, which can improve reliability of a remote switch-off action of the rotary switch.

Embodiments of the present application are implemented as follows.

A rotary switch includes an operating mechanism, an on-off apparatus, and a tripping component, and the operating mechanism includes an energy storage component and a drive component. The drive component is separately in driving connection with the energy storage component and the on-off apparatus. The energy storage component includes a latch and an energy storage spring that cooperates with the latch. The energy storage spring can be separately connected to the latch and the drive component in a snap-fit manner, the drive component is rotated, so that the energy storage component can store energy, and the drive component is used to drive the on-off apparatus to be switched on. The latch cooperates with the tripping component, so that the latch locks or unlocks the energy storage spring. When unlocked, the energy storage spring drives the drive component to rotate to a switch-off position of the on-off apparatus.

Optionally, the operating mechanism further includes an upper cover and a mounting base connected to the upper cover. The drive component includes a rotating shaft and a drive part connected to the rotating shaft. A mounting slot is disposed in the mounting base. A rotating base is disposed in the mounting slot, the rotating base is connected to the on-off apparatus, and a first elastic part is disposed in the rotating base. When the rotating shaft is rotated, the rotating base can be driven to rotate by using the first elastic part, to switch off or switch on the on-off apparatus.

Optionally, a first push part and a second push part are disposed on the drive part. The rotating base includes a rotating base body, and a first pawl and a second pawl disposed on the rotating base body. The first pawl and the second pawl are disposed opposite to each other, and there is a preset space between an end face of the first pawl and an end face of the second pawl. A first locking protrusion and a second locking protrusion are disposed on the upper cover at a corresponding interval, and both the first locking protrusion and the second locking protrusion can be clamped in the preset space. There is a first gap between the first pawl and the rotating base body, and there is a second gap between the second pawl and the rotating base body. The first push part is capable of abutting against the first pawl, so that the first pawl retracts towards the first gap, to be released from locking of the first locking protrusion. The second push part is capable of abutting against the second pawl, so that the second pawl retracts towards the second gap, to be released from locking of the second locking protrusion.

Optionally, a first protrusion is further disposed on the drive part, a stopper is further disposed in the rotating base, and the first elastic part includes an elastic body, and a first end part and a second end part separately connected to the elastic body. The first end part abuts against the first protrusion, and the second end part abuts against the stopper.

Optionally, the energy storage spring includes an energy storage spring body, and a first torsion arm and a second torsion arm separately connected to the energy storage spring body, and a second protrusion is further disposed on the drive part. The first torsion arm is connected to the upper cover in a snap-fit manner, and the second torsion arm abuts against the second protrusion. The latch includes a hinged part hinged with the upper cover, a locking part for locking the second torsion arm, and a tripping part that cooperates with the tripping component. The latch cooperates with the tripping component by using the tripping part.

Optionally, a guide face is disposed between the hinged part and the locking part, and a locking face is disposed on a side, of the locking part, away from the guide face.

Optionally, the energy storage component further includes a second elastic part, and the second elastic part is connected to the latch, so that the latch locks the energy storage spring.

Optionally, the tripping component includes a housing and a trip unit disposed in the housing, the housing is connected to the operating mechanism, and a reset button is further disposed on the housing, to reset the trip unit after the latch unlocks the energy storage spring.

Optionally, the on-off apparatus includes a mounting housing, and a moving contact component, a fixed contact component, and a shaft coupler disposed in the mounting housing. The moving contact component is connected to the rotating base through the shaft coupler, so that the rotating base drives the moving contact component to be in contact with or separate from the fixed contact component.

Optionally, a sealing ring is disposed on the rotating shaft, and the sealing ring is located between the rotating shaft and the upper cover. A knob is further disposed on the rotating shaft, and the knob is located on an end, of the rotating shaft, away from the drive part.

Beneficial effects of the embodiments of the present application are as follows.

In the rotary switch according to the embodiments of the present application, the energy storage component and the on-off apparatus are separately connected to the drive component, the energy storage component includes the latch and the energy storage spring that cooperates with the latch, the energy storage spring can be separately connected to the latch and the drive component in a snap-fit manner, and when the drive component moves, the energy storage spring is driven to act. Since the energy storage spring can be connected to the latch in a snap-fit manner, the energy storage spring can accumulate elastic potential energy. When the energy storage spring accumulates elastic potential energy driven by the drive component, the drive component may drive the on-off apparatus to act, to switch on the on-off apparatus. The latch cooperates with the tripping component. When the tripping component acts, the latch can be driven to act, so that the latch is no longer connected to the energy storage spring in a snap-fit manner and no longer locks the energy storage spring. In this case, the energy storage spring is connected to the drive component in a snap-fit manner in a process of restoration from elastic deformation, to drive the drive component to rotate to the switch-off position of the on-off apparatus to implement a switch-off operation of the on-off apparatus. This process does not require a continuous power output to be provided to switch off the on-off apparatus. This can improve reliability of a remote switch-off action of the rotary switch.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and persons of ordinary skill in the art may obtain other accompanying drawings from these accompanying drawings without creative efforts.

Figure 1:
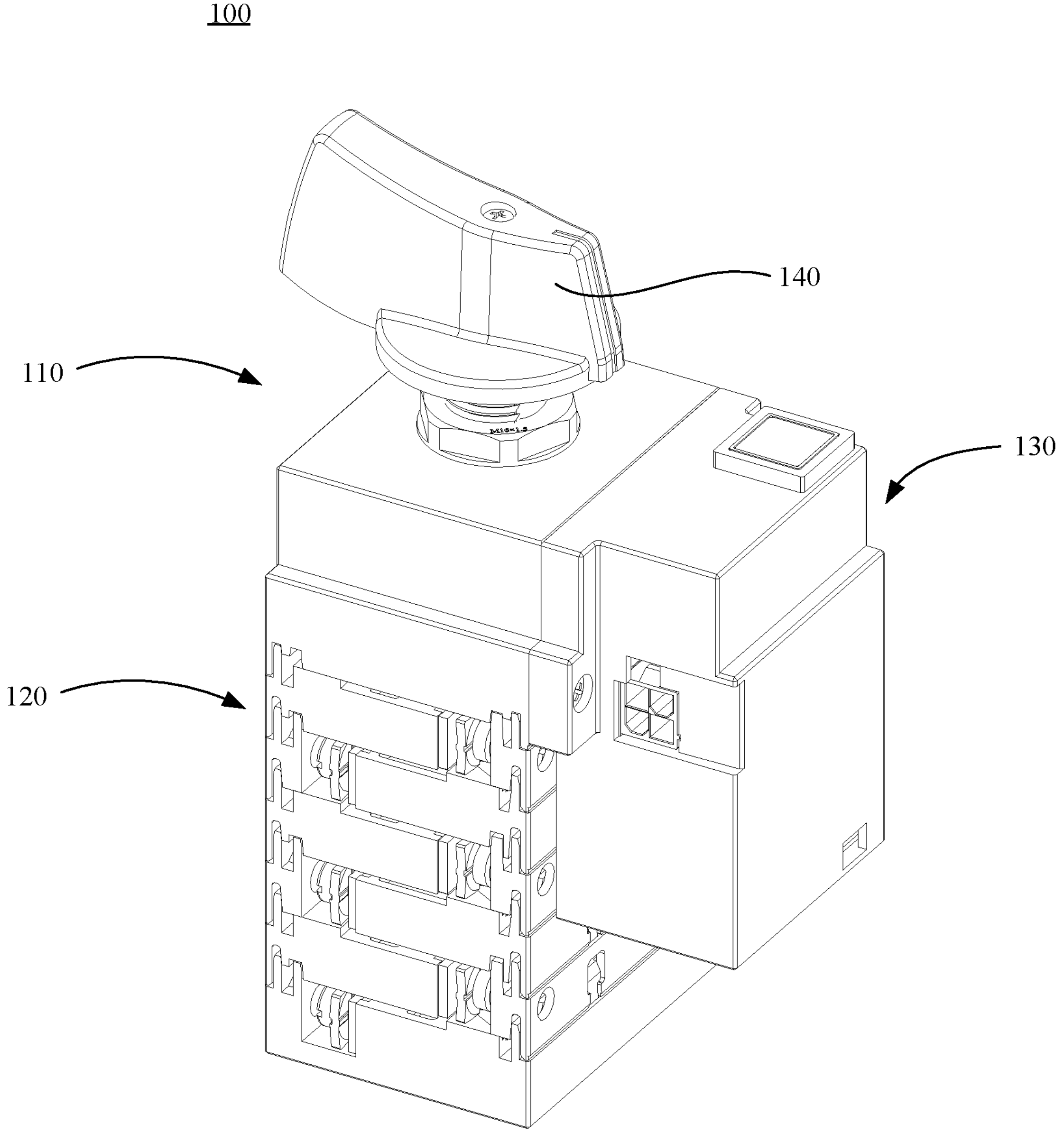
FIG. 1 is a schematic diagram of a structure of a rotary switch according to an embodiment of the present application.

Reference numerals: Rotary switch 100. Operating mechanism 110. Energy storage component 112. Latch 1122. Hinged part 1122*a*. Locking part 1122*b*. Tripping part 1122*c*. Guide face 1122*d*. Locking face 1122*e*. Energy storage spring 1124. Energy storage spring body 1124*a*. First torsion arm 1124*b*. Second torsion arm 1124*c*. Second elastic part 1126. Drive component 114. Rotating shaft 1142. Ring slot 1142*a*. Drive part 1144. First push part 1144*a*. Second push part 1144*b*. First protrusion 1144*c*. Second protrusion 1144*d*. Upper cover 115. First locking protrusion 1152. Second locking protrusion 1154. Mounting base 116. Mounting slot 1162. Rotating base 117. Stopper 1171. Rotating base body 1172. Connection hole 1173. First pawl 1174. Second pawl 1176. Preset space 1177. First gap 1178. Second gap 1179. First elastic part 118. Elastic body 1182. First end part 1184. Second end part 1186. On-off apparatus 120. Moving contact component 122. Fixed contact component 124. Shaft coupler 126. Mounting housing 128. Tripping component 130. Housing 132. Trip unit 134. Reset button 136. Knob 140.

DESCRIPTION OF EMBODIMENTS

To make the objectives, technical solutions, and advantages of embodiments of the present application clearer, the following clearly describes the technical solutions in embodiments of the present application with reference to the accompanying drawings in embodiments of the present application. It is clear that the described embodiments are some but not all of embodiments of the present application. Generally, components of the embodiments of the present application described and shown in the accompanying drawings may be arranged and designed with various different configurations.

Therefore, the following detailed description of the embodiments of the present application, which are set forth in the accompanying drawings, is not intended to limit the scope of protection of the present application, but merely represents selected embodiments of the present application. Other embodiments obtained by persons of ordinary skill in the art based on embodiments of the present application without creative efforts shall fall within the protection scope of the present application.

It should be noted that similar reference signs and letters refer to similar items in the following accompanying drawings. Therefore, once a specific item is defined in one of the accompanying drawings, it need not be further defined and explained in subsequent accompanying drawings. In addition, the terms “first”, “second”, and the like are only used for distinction and description, and shall not be understood as an indication or implication of relative importance.

In the description of the present application, it should be further noted that the terms "disposing" and "connection" should be understood in a broad sense unless otherwise expressly specified and limited, for example, may be a fixed connection, or may be a detachable connection, or may be an integral connection; may be a mechanical connection or an electrical connection; or may be a direct connection, an indirect connection based on an intermediate medium, or communicating inside two elements. For persons of ordinary skill in the art, specific meanings of the foregoing terms in the present application may be understood based on a specific situation.

Figure 2:
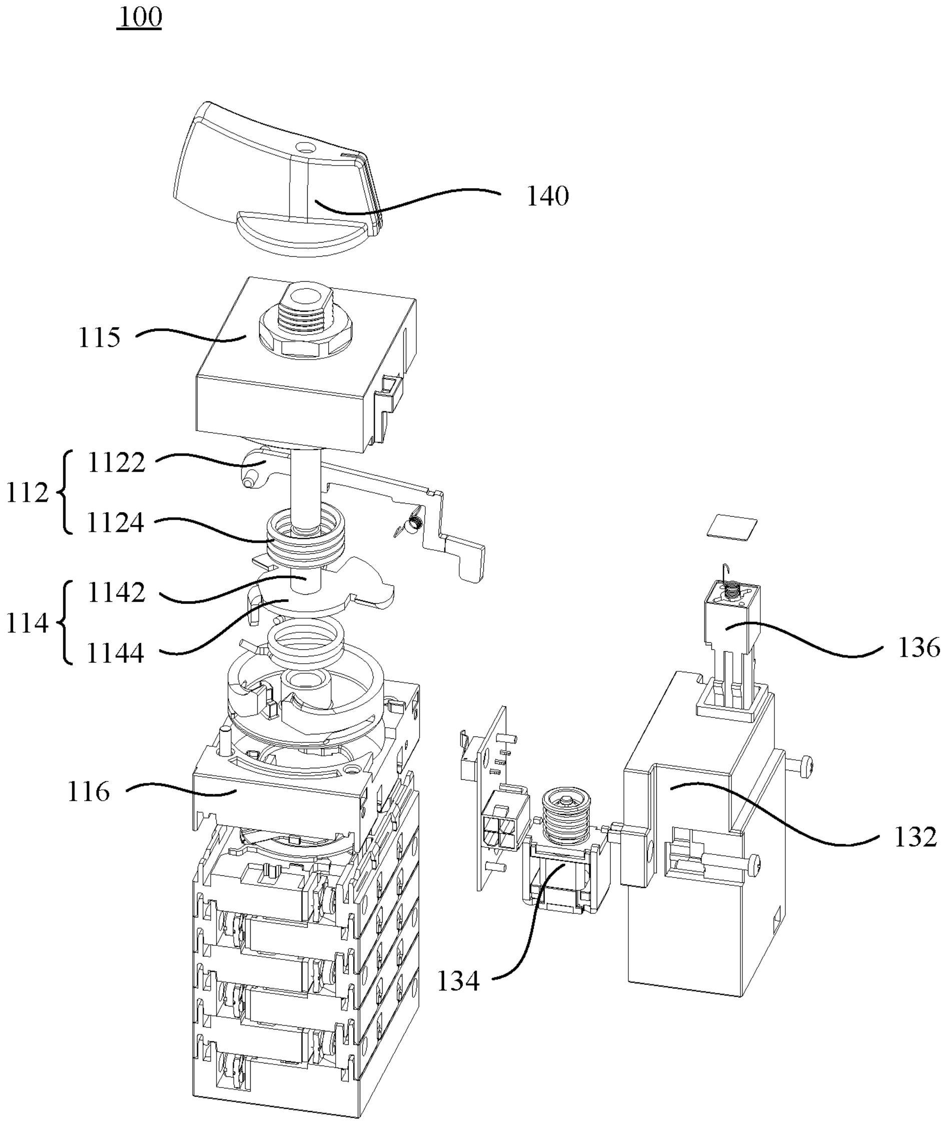
FIG. 2 is an exploded view of FIG. 1.

Referring to FIG. 1 and FIG. 2, the embodiments provide a rotary switch 100, including an operating mechanism 110, an on-off apparatus 120, and a tripping component 130, and the operating mechanism 110 includes an energy storage component 112 and a drive component 114. The drive component 114 is separately in driving connection with the energy storage component 112 and the on-off apparatus 120. The energy storage component 112 includes a latch 1122 and an energy storage spring 1124 that cooperates with the latch 1122. The energy storage spring 1124 can be separately connected to the latch 1122 and the drive component 114 in a snap-fit manner, the drive component 114 is rotated, so that the energy storage component 112 can store energy, and the drive component 114 is used to drive the on-off apparatus 120 to be switched on. The latch 1122 cooperates with the tripping component 130, so that the latch 1122 locks or unlocks the energy storage spring 1124. When unlocked, the energy storage spring 1124 drives the drive component 114 to rotate to a switch-off position of the on-off apparatus 120.

Specifically, the operating mechanism 110 is mainly used as an actuator for manual switch-on and remote automatic switch-off. When switch-on is required, the drive component 114 is rotated. In a movement process of the drive component 114, the energy storage spring 1124 completes energy storage, and the on-off apparatus 120 is driven to act, to switch on the on-off apparatus 120. When remote control switch-off is required, the tripping component 130 is made to act, by sending an electrical signal control instruction to the tripping component 130. When the tripping component 130 acts, the latch 1122 is driven to act, so that the latch 1122 and the energy storage spring 1124 are separated in a snap-fit position, elastic potential energy accumulated by the energy storage spring 1124 is released, and in a process of releasing the elastic potential energy and restoration from elastic deformation, the drive component 114 is driven to rotate to the switch-off position of the on-off apparatus 120 to implement a switch-off operation of the on-off apparatus 120.

In the rotary switch 100 according to the embodiments of the present application, the energy storage component 112 and the on-off apparatus 120 are separately connected to the drive component 114, the energy storage component 112 includes the latch 1122 and the energy storage spring 1124 that cooperates with the latch 1122, the energy storage spring 1124 can be separately connected to the latch 1122 and the drive component 114 in a snap-fit manner, and when the drive component 114 moves, the energy storage spring 1124 is driven to act. Since the energy storage spring 1124 can be connected to the latch 1122 in a snap-fit manner, the energy storage spring 1124 can accumulate elastic potential energy. When the energy storage spring 1124 accumulates elastic potential energy driven by the drive component 114, the drive component 114 may drive the on-off apparatus 120 to act, to switch on the on-off apparatus 120. The latch 1122 cooperates with the tripping component 130. When the tripping component 130 acts, the latch 1122 can be driven to act, so that the latch 1122 is no longer connected to the energy storage spring 1124 in a snap-fit manner and no longer locks the energy storage spring 1124. In this case, the energy storage spring 1124 is connected to the drive component 114 in a snap-fit manner in a process of restoration from elastic deformation, to drive the drive component 114 to rotate to the switch-off position of the on-off apparatus 120 to implement a switch-off operation of the on-off apparatus 120. This process does not require a continuous power output to be provided to switch off the on-off apparatus 120. This can improve reliability of a remote switch-off action of the rotary switch 100.

Figure 3:
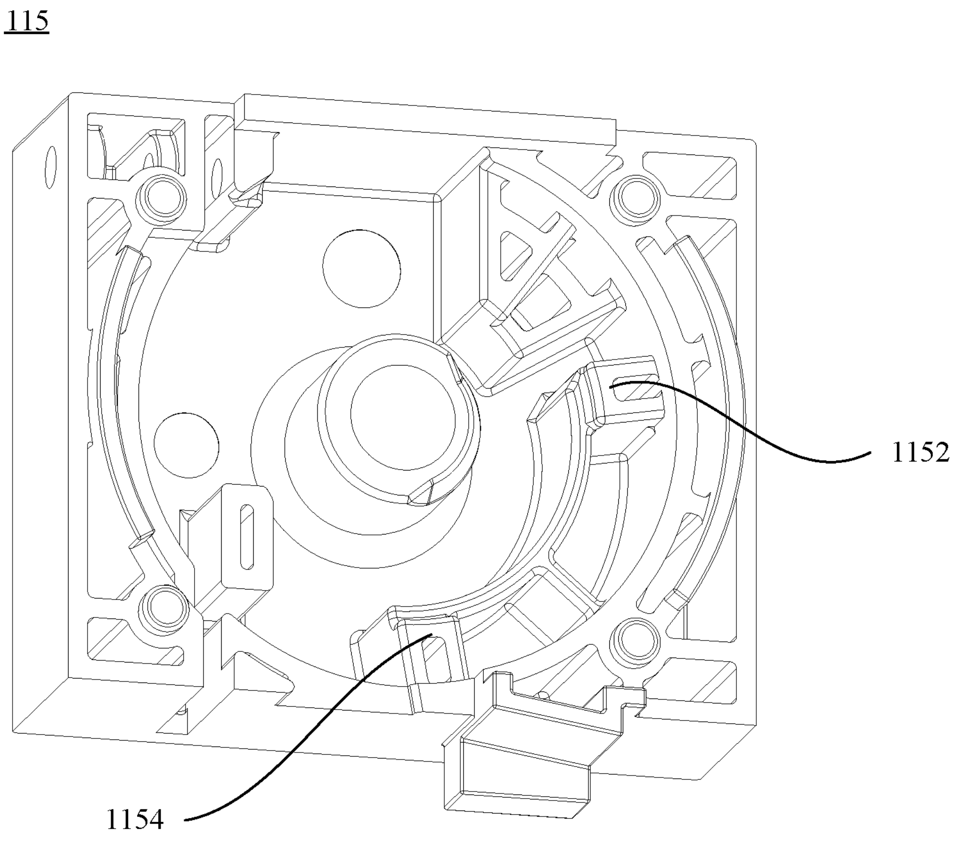
FIG. 3 is a schematic diagram of a structure of an upper cover according to an embodiment of the present application.
Figure 4:
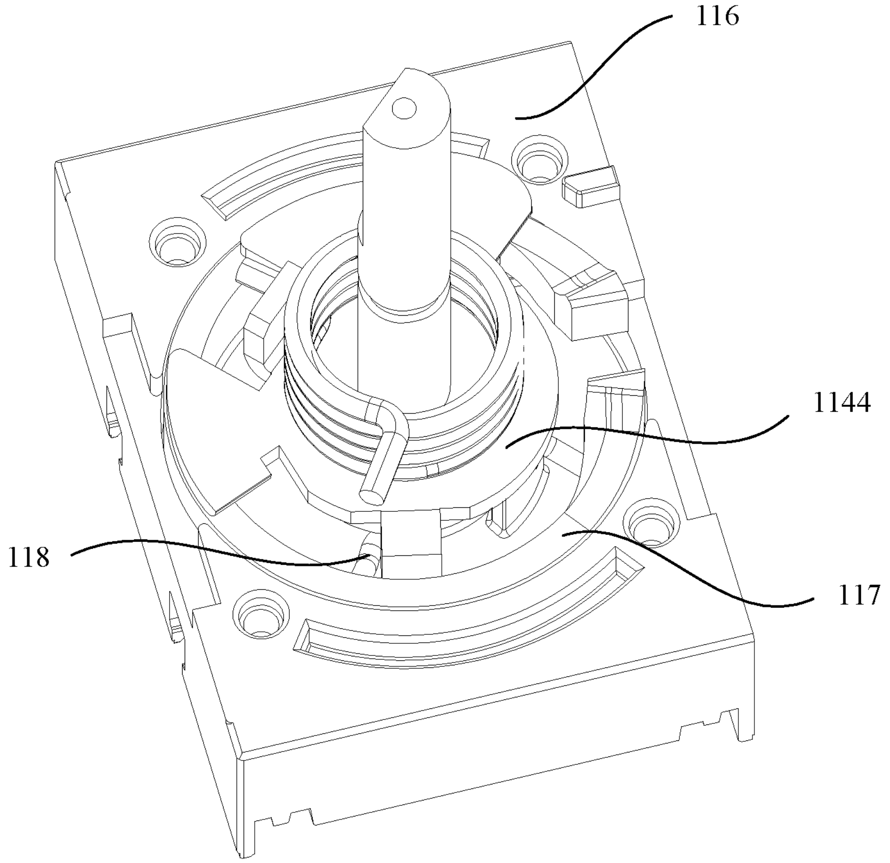
FIG. 4 is a schematic diagram of a structure of a connection between a mounting base and a drive component according to an embodiment of the present application.
Figure 5:
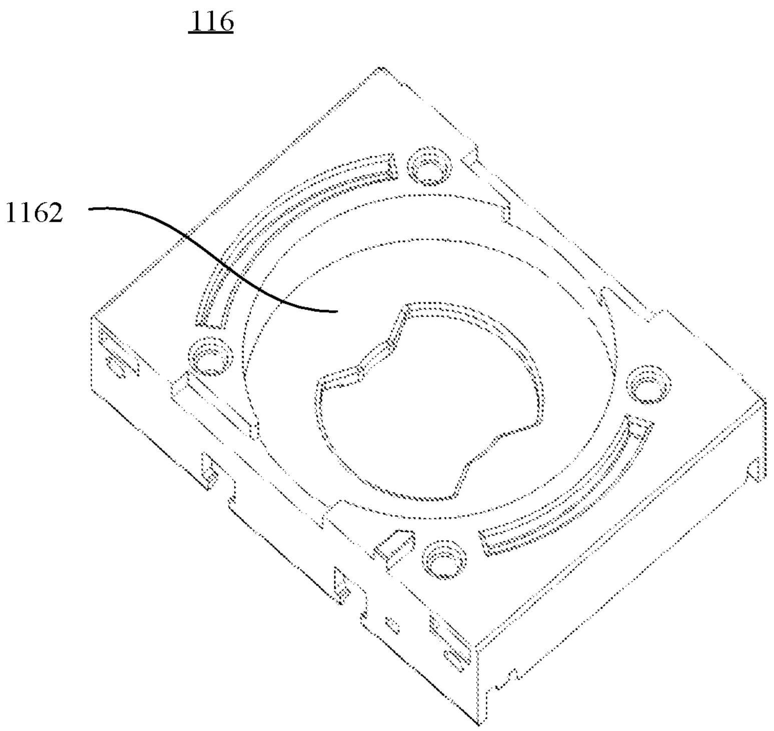
FIG. 5 is a schematic diagram of a structure of a mounting base according to an embodiment of the present application.

As shown in FIG. 3, FIG. 4, and FIG. 5, the operating mechanism 110 further includes an upper cover 115 and a mounting base 116 connected to the upper cover 115. Referring to FIG. 6 again, the drive component 114 includes a rotating shaft 1142 and a drive part 1144 connected to the rotating shaft 1142. A mounting slot 1162 is disposed in the mounting base 116. A rotating base 117 is disposed in the mounting slot 1162, the rotating base 117 is connected to the on-off apparatus 120, and a first elastic part 118 (shown in FIG. 7) is disposed in the rotating base 117. When the rotating shaft 1142 is rotated, the rotating base 117 can be driven to rotate by using the first elastic part 118, to switch off or switch on the on-off apparatus 120.

Specifically, the rotating shaft 1142 passes through the upper cover 115 and extends to a position in which the mounting base 116 is located. The drive part 1144 connected to the rotating shaft 1142 is located in the position in which the mounting base 116 is located. When the rotating shaft 1142 is rotated, the drive part 1144 is used to drive the first elastic part 118 to be elastically deformed, and an elastic force for the first elastic part 118 to restore from elastic deformation causes the rotating base 117 to rotate, to drive the on-off apparatus 120 to switch off or switch on. Because the rotating base 117 rotates in the mounting slot 1162, an outer ring of the rotating base 117 and an inner ring of the mounting slot 1162 are circular, to facilitate relative rotation.

It should be noted that the embodiments do not impose a specific limitation on the first elastic part 118, provided that a required driving force for switching off or switching on the on-off apparatus 120 can be provided. For example, the first elastic part 118 may be an elastic part such as a torsion spring or a clockwork spring, in a process in which when the rotating shaft 1142 is rotated so that the energy storage spring 1124 stores energy, the first elastic part 118 is driven to elastically deform, and the first elastic part 118 drives the rotating base 117 to rotate, to switch on the on-off apparatus 120. In a process of releasing the energy of the energy storage spring 1124, the first elastic part 118 is also restored from elastic deformation to perform work, and drives the rotating base 117 to rotate back, to switch off the on-off apparatus 120.

Figure 6:
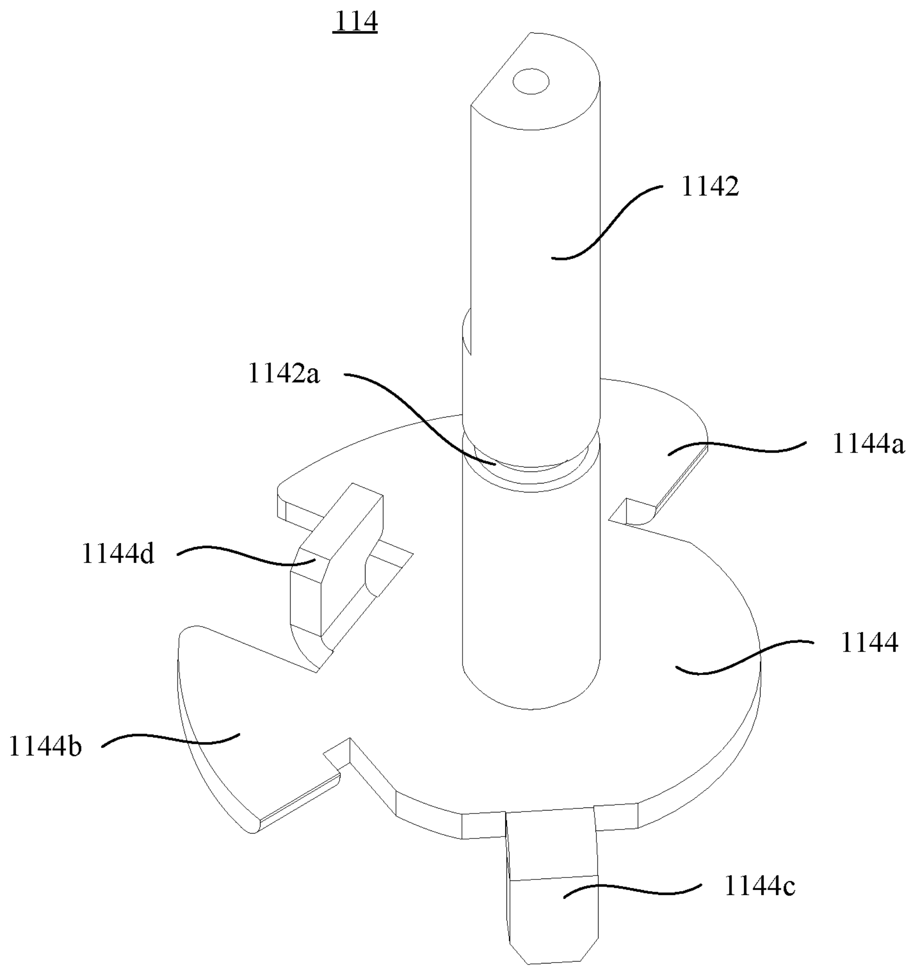
FIG. 6 is a schematic diagram of a structure of a drive component according to an embodiment of the present application.
Figure 8:
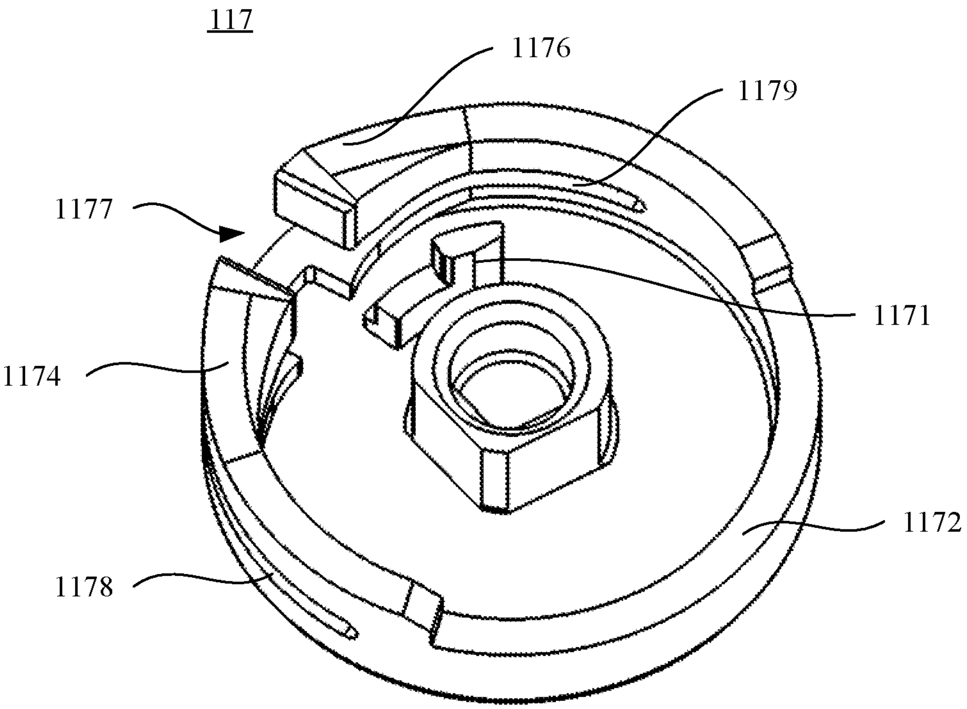
FIG. 8 is a schematic diagram 1 of a structure of a rotating base according to an embodiment of the present application.

As shown in FIG. 6 and FIG. 8, a first push part **1144*a* and a second push part 1144*b* are disposed on the drive part 1144. The rotating base 117 includes a rotating base body 1172, and a first pawl 1174 and a second pawl 1176 disposed on the rotating base body 1172. The first pawl 1174 and the second pawl 1176 are disposed opposite to each other, and there is a preset space 1177 between an end face of the first pawl 1174 and an end face of the second pawl 1176. Referring to FIG. 3 again, a first locking protrusion 1152 and a second locking protrusion 1154 are disposed on the upper cover 115 at a corresponding interval, and both the first locking protrusion 1152 and the second locking protrusion 1154 can be clamped in the preset space 1177. There is a first gap 1178 between the first pawl 1174 and the rotating base body 1172, and there is a second gap 1179 between the second pawl 1176 and the rotating base body 1172. The first push part 1144***a* is capable of abutting against the first pawl 1174, so that the first pawl 1174 retracts towards the first gap 1178, to be released from locking of the first locking protrusion 1152. The second push part 1144*b* is capable of abutting against the second pawl 1176, so that the second pawl 1176 retracts towards the second gap 1179, to be released from locking of the second locking protrusion 1154.

Figure 10:
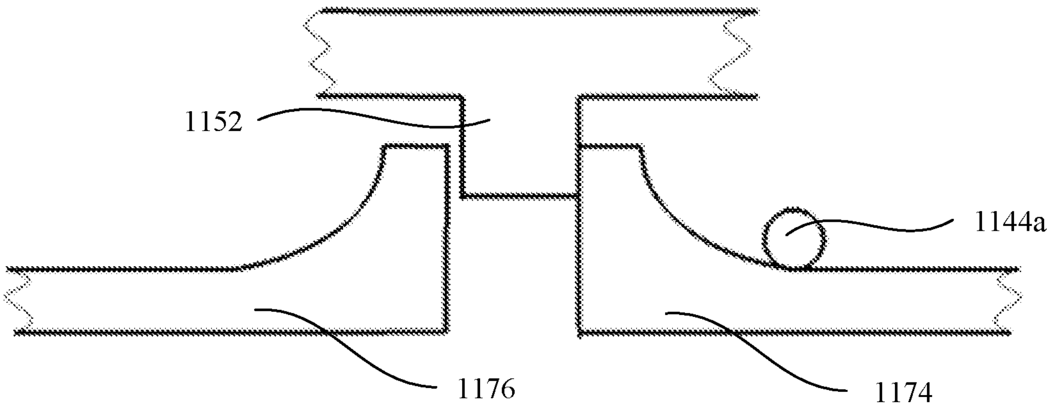
FIG. 10 is a schematic diagram 1 of a structure of cooperation between a rotating base and an upper cover according to an embodiment of the present application.
Figure 11:
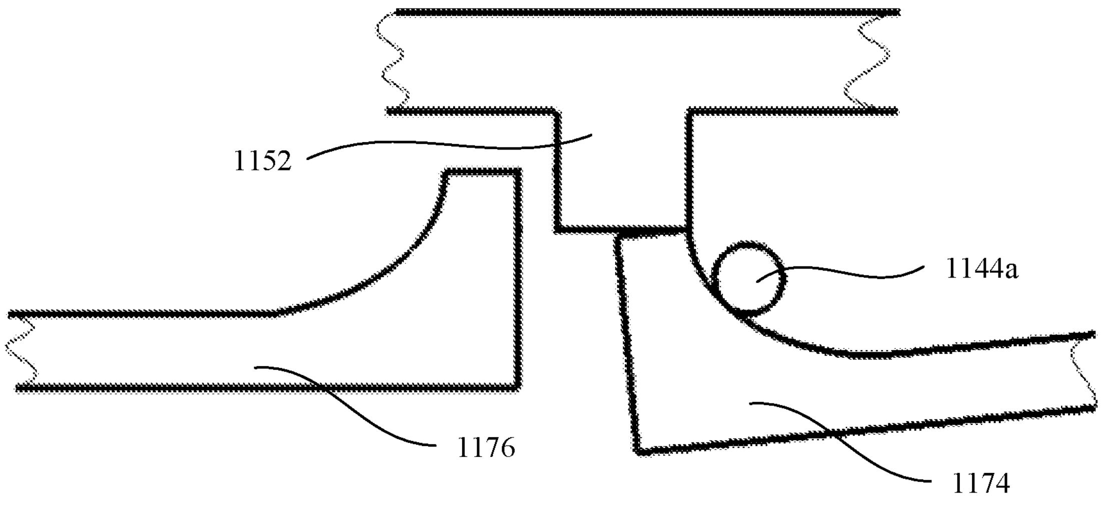
FIG. 11 is a schematic diagram 2 of a structure of cooperation between a rotating base and an upper cover according to an embodiment of the present application.

Specifically, in a process of manually operating the rotating shaft 1142 to rotate so that the energy storage spring 1124 stores energy and then drives the on-off apparatus 120 to be switched on, the drive part 1144 is rotated synchronously with the rotating shaft 1142. At an initial moment at which the drive part 1144 is rotated, the first push part 1144*a* moves towards the first pawl 1174. As the rotation continues, the first push part 1144*a* abuts against the first pawl 1174 (as shown in FIG. 10), and continues to push the first pawl 1174 forward until the first push part 1144*a* presses the first pawl 1174 to deform towards the first gap 1178 (as shown in FIG. 11). In a process in which the first pawl 1174 is pressed by the first push part 1144*a* and then deformed, the end face of the first pawl 1174 is misaligned with the first locking protrusion 1152, so that the rotating base 117 can be continuously rotated, to switch on the on-off apparatus 120. When the on-off apparatus 120 is switched on, the preset space 1177 between the end face of the first pawl 1174 and the end face of the second pawl 1176 corresponds to the second locking protrusion 1154 to lock the rotating base 117 to prevent an unexpected action of the on-off apparatus 120. This helps to ensure stability of a state of the on-off apparatus 120.

Similarly, in a process of remote control switch-off, the tripping component 130 acts to make the latch 1122 unlock the energy storage spring 1124. In a switch-off process, elastic potential energy accumulated by the energy storage spring 1124 is released to drive the rotating shaft 1142 to rotate back. The drive part 1144 is rotated synchronously with the rotating shaft 1142, and the second push part 1144*b* moves towards the second pawl 1176. As the rotation continues, the second push part 1144*b* abuts against the second pawl 1176, and continues to push the second pawl 1176 forward until the second push part 1144*b* presses the second pawl 1176 to deform towards the second gap 1179. In a process in which the second pawl 1176 is pressed by the second push part 1144*b* and then deformed, the end face of the second pawl 1176 is misaligned with the second locking protrusion 1154, so that the rotating base 117 can be continuously rotated, to switch off the on-off apparatus 120. When the on-off apparatus 120 is switched off, the preset space 1177 between the end face of the first pawl 1174 and the end face of the second pawl 1176 corresponds to the first locking protrusion 1152, so that rotation of the rotating base 117 can be driven only by the operating mechanism 110 to prevent an unexpected action of the on-off apparatus 120. This helps to ensure stability of a state of the on-off apparatus 120.

Figure 7:
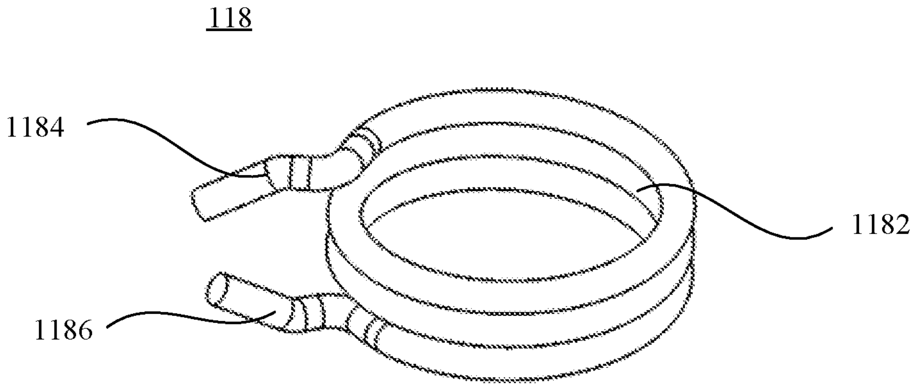
FIG. 7 is a schematic diagram of a structure of a first elastic part according to an embodiment of the present application.

As shown in FIG. 6 to FIG. 8, a first protrusion 1144*c* facing the rotating base 117 is further disposed on the drive part 1144, a stopper 1171 is further disposed in the rotating base 117, and in an optional embodiment of this application, the first elastic part 118 includes an elastic body 1182, and a first end part 1184 and a second end part 1186 separately connected to the elastic body 1182. The first end part 1184 abuts against the first protrusion 1144*c*, and the second end part 1186 abuts against the stopper 1171.

Specifically, in a process of manually operating the rotating shaft 1142 to rotate to perform switch-on, the drive part 1144 is rotated, so that the first elastic part 118 is elastically deformed. As the rotation continues, the first push part 1144*a* abuts against the first pawl 1174, and continues to push the first pawl 1174 forward until the first push part 1144*a* presses the first pawl 1174 to deform towards the first gap 1178, so that the first pawl 1174 passes the first locking protrusion 1152. After the first pawl 1174 passes the first locking protrusion 1152, the first locking protrusion 1152 no longer plays a locking role on the rotating base 117, and the first elastic part 118 drives the rotating base 117 to switch on the on-off apparatus 120 through the stopper 1171. Similarly, in a process of remote control switch-off, elastic potential energy accumulated by the energy storage spring 1124 is released to drive the rotating shaft 1142 to rotate back. The drive part 1144 is rotated synchronously with the rotating shaft 1142. The second push part 1144*b* abuts against the second pawl 1176, and continues to push the second pawl 1176 forward until the second push part 1144*b* presses the second pawl 1176 to deform towards the second gap 1179. In a process in which the second pawl 1176 is pressed by the second push part 1144*b* and then deformed, the end face of the second pawl 1176 is misaligned with the second locking protrusion 1154, and the first elastic part 118 drives the rotating base 117 to rotate back by using the stopper 1171, to switch off the on-off apparatus 120.

Figure 12:
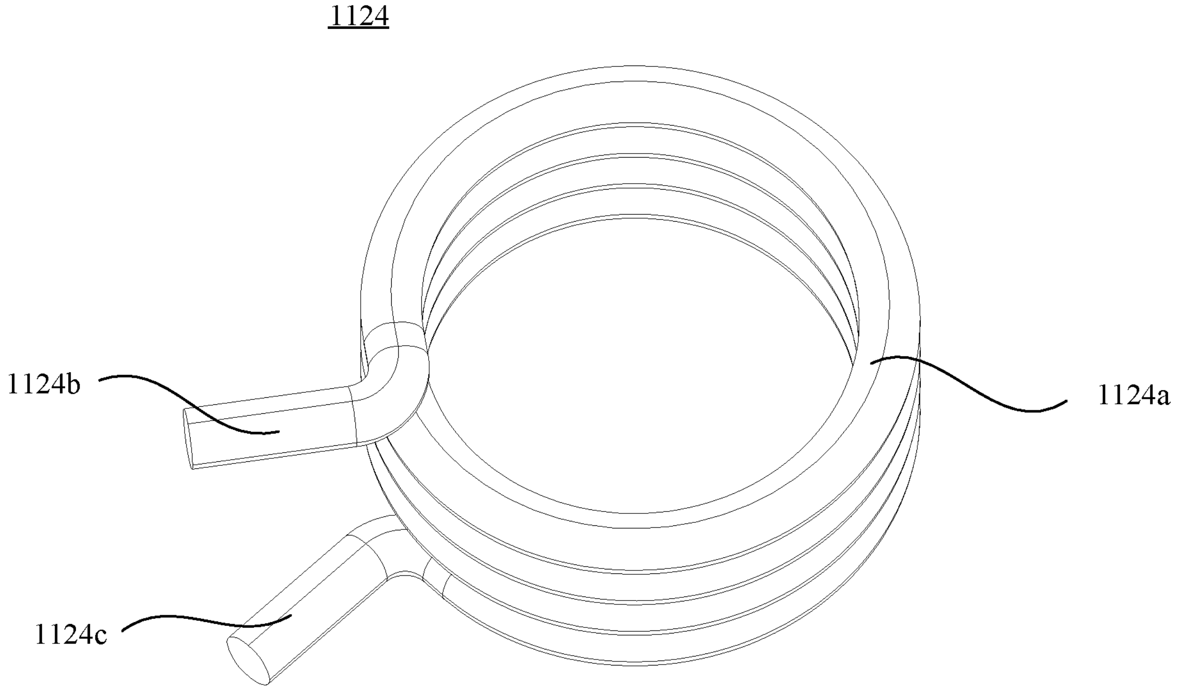
FIG. 12 is a schematic diagram of a structure of an energy storage spring according to an embodiment of the present application.
Figure 13:
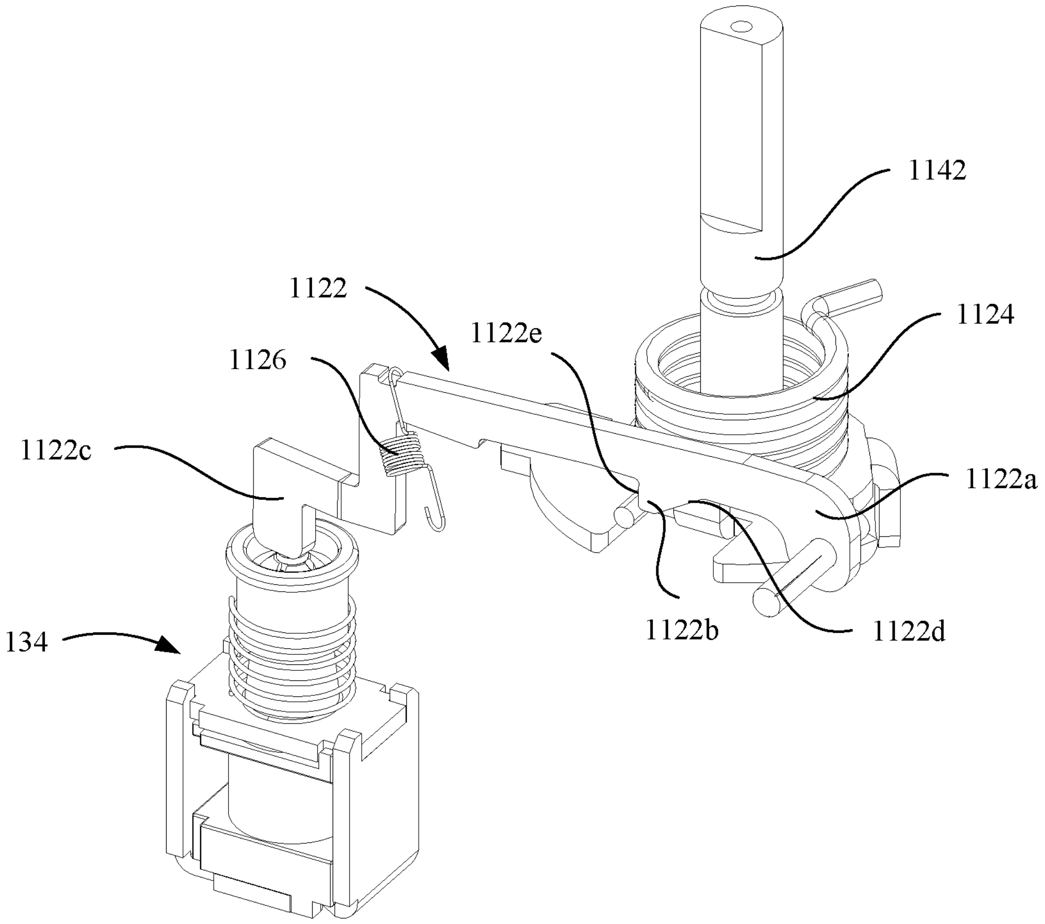
FIG. 13 is a schematic diagram of a structure of cooperation between an operating mechanism and a tripping component according to an embodiment of the present application.

As shown in FIG. 2, FIG. 12, and FIG. 13, the energy storage spring 1124 is disposed on the rotating shaft 1142, the energy storage spring 1124 includes an energy storage spring body 1124*a*, and a first torsion arm 1124*b* and a second torsion arm 1124*c* separately connected to the energy storage spring body 1124*a*, and a second protrusion 1144*d* away from the rotating base 117 is further disposed on the drive part 1144. The first torsion arm 1124*b* is connected to the upper cover 115 in a snap-fit manner, and the second torsion arm 1124*c* abuts against the second protrusion 1144*d*. The latch 1122 includes a hinged part 1122*a* hinged with the upper cover 115, a locking part 1122*b* for locking the second torsion arm 1124*c*, and a tripping part 1122*c* that cooperates with the tripping component 130. The latch 1122 cooperates with the tripping component 130 by using the tripping part 1122*c*.

Specifically, when the rotating shaft 1142 is rotated so that the drive part 1144 is rotated synchronously with the rotating shaft 1142, the second protrusion 1144*d* of the drive part 1144 drives the second torsion arm 1124*c* of the energy storage spring 1124 to move synchronously with the drive part 1144, and the first torsion arm 1124*b* of the energy storage spring 1124 is connected to the upper cover 115 in a snap-fit manner, so that the energy storage spring 1124 is elastically deformed in a movement process of the drive part 1144, thereby generating elastic potential energy and switching on the on-off apparatus 120 at the same time. When the second protrusion 1144*d* of the drive part 1144 drives the second torsion arm 1124*c* of the energy storage spring 1124 to move synchronously with the drive part 1144, the second torsion arm 1124*c* of the energy storage spring 1124 is clamped to the locking part 1122*b*, so that elastic potential energy generated by the energy storage spring 1124 is maintained. When the energy storage spring 1124 is locked, the rotating shaft 1142 may be rotated back and forth to switch off or switch on the rotary switch 100. In addition, when the energy storage spring 1124 is locked by the latch 1122 to store energy, if the rotating shaft 1142 is rotated to switch on the rotary switch 100, there is no need to drive the energy storage spring 1124 to elastically deform, and therefore, the switch-on is more labor-saving.

The tripping component 130 is configured to receive a control signal, and act based on the control signal, for example, exerting a force on the tripping part 1122*c* to move the tripping part 1122*c* away from a position in which the tripping component 130 is located. When the tripping part 1122*c* moves away from the tripping component 130, the hinged part 1122*a* of the latch 1122 and the upper cover 115 are rotated relative to each other, so that the locking part 1122*b* of the latch 1122 moves. The second torsion arm 1124*c* of the energy storage spring 1124 is no longer limited, and the energy storage spring 1124 can be restored from elastic deformation, to drive the drive part 1144 to rotate, so that the drive part 1144 is rotated to a switch-off position, thereby completing a switch-off operation of the on-off apparatus 120.

As shown in FIG. 13, a guide face 1122*d* is disposed between the hinged part 1122*a* and the locking part 1122*b*, and a locking face 1122*e* is disposed on a side, of the locking part 1122*b*, away from the guide face 1122*d*.

Specifically, when the rotating shaft 1142 drives the drive part 1144 to rotate, the second protrusion 1144*d* on the drive part 1144 drives the second torsion arm 1124*c* to rotate following the drive part 1144. When the second torsion arm 1124*c* moves, the second torsion arm 1124*c* abuts against the guide face 1122*d*, and moves along the guide face 1122*d* to a position in which the locking part 1122*b* is located. When the second torsion arm 1124*c* moves to a side, of the locking part 1122*b*, away from the guide face 1122*d*, that is, when the second torsion arm 1124*c* moves to a side, of the locking part 1122*b*, provided with the locking face 1122*e*, the second torsion arm 1124*c* is locked by the locking part 1122*b*. Even if the drive part 1144 no longer exerts a force on the second torsion arm 1124*c*, the second torsion arm 1124*c* cannot be restored to an initial state, so that an energy storage operation is performed on the energy storage spring 1124.

When the tripping component 130 receives a tripping signal, the tripping component 130 acts to move the tripping part 1122*c* away from the position in which the tripping component 130 is located. In a movement process of the tripping part 1122*c*, a locking amount of the locking face 1122*e* for the second torsion arm 1124*c* of the energy storage spring 1124 is gradually reduced until the second torsion arm 1124*c* is released from a locking action of the locking part 1122*b*. After the second torsion arm 1124*c* is released from the action of the locking part 1122*b* of the latch 1122, the elastic potential energy accumulated by the energy storage spring 1124 is released, and the second protrusion 1144*d* is used to drive the drive part 1144 to rotate to a switch-off position, so that the on-off apparatus 120 is switched off.

As shown in FIG. 2 and FIG. 13, the tripping component 130 includes a housing 132 and a trip unit 134 disposed in the housing 132, the housing 132 is connected to the operating mechanism 110, and a reset button 136 is further disposed on the housing 132, to reset the trip unit 134 after the latch 1122 unlocks the energy storage spring 1124.

Specifically, the trip unit 134 may be any one of a magnetic flux converter, a shunt trip unit, an undervoltage trip unit, and an overvoltage trip unit. An action of the trip unit 134 is controlled by an electrical signal, so that the latch 1122 releases limit on the energy storage spring 1124, so that the rotary switch 100 responds quickly and implements a remote switch-off function. After the trip unit 134 acts, the trip unit 134 needs to be reset manually to facilitate a next action. The reset button 136 is used to make a reset operation of the trip unit 134 easier without using other auxiliary tools.

As shown in FIG. 13, the energy storage component 112 further includes a second elastic part 1126, and the second elastic part 1126 is connected to the latch 1122, so that the latch 1122 locks the energy storage spring 1124.

For example, the second elastic part 1126 is disposed between the latch 1122 and the upper cover 115, or the second elastic part 1126 is disposed between the latch 1122 and the mounting base 116. Specifically, when the second elastic part 1126 is disposed between the latch 1122 and the upper cover 115, the second elastic part 1126 may be in a form of a compression spring or an elastic sheet, so that there is a repulsive force between the latch 1122 and the upper cover 115, and the tripping part 1122*c* tends to move towards the trip unit 134. When the second elastic part 1126 is disposed between the latch 1122 and the mounting base 116, the second elastic part 1126 may be in a form of a tension spring or an elastic rope, so that the tripping part 1122*c* tends to move towards the trip unit 134, to ensure that the locking part 1122*b* can stably lock the second torsion arm 1124*c* of the energy storage spring 1124.

Figure 9:
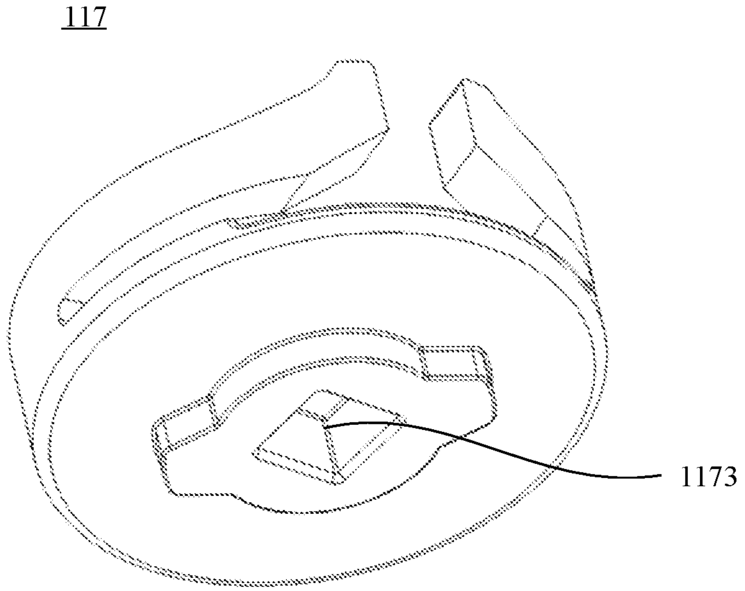
FIG. 9 is a schematic diagram 2 of a structure of a rotating base according to an embodiment of the present application.
Figure 14:
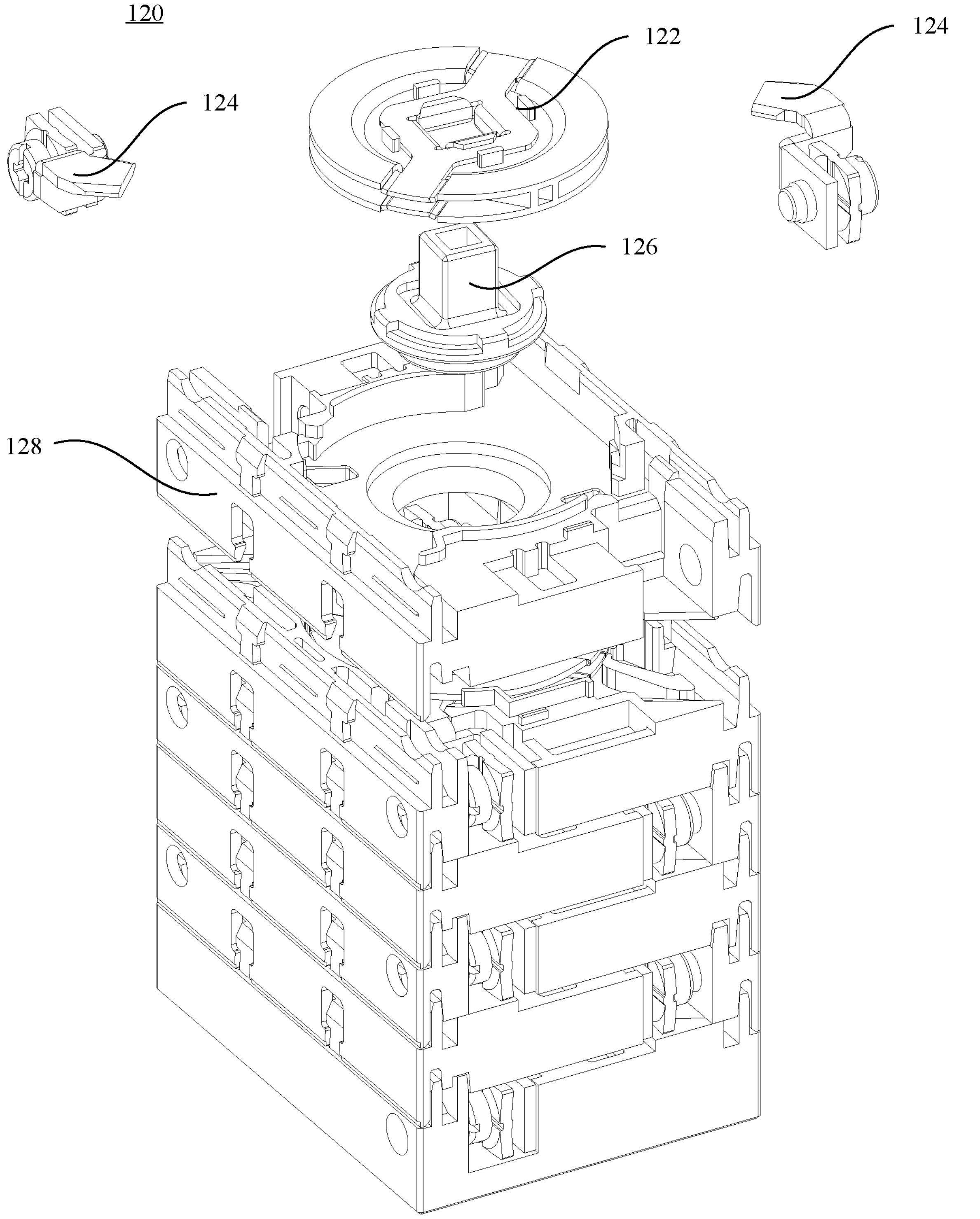
FIG. 14 is a schematic diagram of a structure of an on-off apparatus according to an embodiment of the present application.

As shown in FIG. 9 and FIG. 14, the on-off apparatus 120 includes a mounting housing 128, and a moving contact component 122, a fixed contact component 124, and a shaft coupler 126 disposed in the mounting housing 128. The moving contact component 122 is connected to the rotating base 117 through the shaft coupler 126, so that the rotating base 117 drives the moving contact component 122 to be in contact with or separate from the fixed contact component 124.

For example, a connection hole 1173 is correspondingly disposed on the rotating base 117, so that the shaft coupler 126 is connected to the rotating base 117, and the moving contact component 122 is also connected to the shaft coupler 126, so that the moving contact component 122 and the rotating base 117 are rotated synchronously. Connected conductors are disposed on the moving contact component 122, and there are two fixed contact components 124. Also, a conductor is disposed on each fixed contact component 124. The moving contact component 122 is rotated, so that the conductors on the moving contact component 122 are respectively connected to the conductors on the two fixed contact components to form a connected circuit. When the moving contact component is rotated to another position, the conductors on the two fixed contact components 124 are disconnected to form an open circuit.

As shown in FIG. 2 and FIG. 6, a sealing ring is disposed on the rotating shaft 1142, and the sealing ring is located between the rotating shaft 1142 and the upper cover 115. A knob 140 is further disposed on the rotating shaft 1142, and the knob 140 is located on an end, of the rotating shaft 1142, away from the drive part 1144.

Specifically, a ring slot 1142*a* is disposed on the rotating shaft 1142, and the sealing ring is disposed on the outer ring of the ring slot 1142*a*, so that a position of the sealing ring and a position of the rotating shaft 1142 are relatively fixed. When the rotating shaft 1142 passes through the upper cover 115 and is rotatably connected to the upper cover 115, the sealing ring can play a seal role to enhance sealing performance of the rotary switch 100. At the same time, the knob 140 disposed on the rotating shaft 1142 is used to make it more labor-saving when the rotary switch 100 is manually operated, which is convenient for operation.

The foregoing descriptions are merely some embodiments of the present application and are not intended to limit the present application, and various changes and modifications would have been made by persons skilled in the art. Any modification, equivalent replacement, or improvement made without departing from the principle of the present application shall fall within the protection scope of the present application.

What is claimed is:

1. A rotary switch comprising an operating mechanism, an on-off apparatus, and a tripping component, wherein the operating mechanism comprises an energy storage component and a drive component separately in driving connection with the energy storage component and the on-off apparatus; and the energy storage component comprises a latch and an energy storage spring that cooperates with the latch, wherein the energy storage spring is configured to be separately connected to the latch and the drive component in a snap-fit manner, wherein the drive component is rotated, so that the energy storage component stores energy and the drive component is used to drive the on-off apparatus to be switched on, wherein the latch cooperates with the tripping component, so that the latch locks or unlocks the energy storage spring, and wherein based on the energy storage spring being unlocked, the energy storage spring drives the drive component to rotate to a switch-off position of the on-off apparatus.

2. The rotary switch according to claim 1, wherein the operating mechanism further comprises an upper cover and a mounting base connected to the upper cover;

the drive component comprises a rotating shaft and a drive part for driving the rotating shaft, wherein rotation of the rotating shaft is driven by using a first elastic part and causes the on-off apparatus to switch between on and off states;

a mounting slot is disposed in the mounting base;

a rotating base connected to the on-off apparatus and disposed in the mounting slot, and first elastic part is disposed in the rotating base.

3. The rotary switch according to claim 2, wherein a first push part and a second push part are disposed on the drive part;

the rotating base comprises a rotating base body, and a first pawl and a second pawl disposed on the rotating base body;

the first pawl and the second pawl are disposed opposite to each other, and there is a preset space between an end face of the first pawl and an end face of the second pawl; and a first locking protrusion and a second locking protrusion are disposed on the upper cover at a corresponding interval, and both the first locking protrusion and the second locking protrusion are configured to be clamped in the preset space; there is a first gap between the first pawl and the rotating base body, and there is a second gap between the second pawl and the rotating base body, wherein the first push part is capable of abutting against the first pawl, so that the first pawl retracts towards the first gap to be released from locking of the first locking protrusion, and wherein the second push part is capable of abutting against the second pawl, so that the second pawl retracts towards the second gap to be released from locking of the second locking protrusion.

4. The rotary switch according to claim 3, wherein a first protrusion is further disposed on the drive part, a stopper is further disposed in the rotating base;

the first elastic part comprises an elastic body, and each of a first end part and a second end part connected to the elastic body; and the first end part abuts against the first protrusion, and the second end part abuts against the stopper.

5. The rotary switch according to claim 2, wherein the energy storage spring comprises an energy storage spring body, and a first torsion arm and a second torsion arm separately connected to the energy storage spring body, and a second protrusion is further disposed on the drive part;

the first torsion arm is connected to the upper cover in a snap-fit manner, and the second torsion arm abuts against the second protrusion;

the latch comprises a hinged part hinged with the upper cover, a locking part for locking the second torsion arm, and a tripping part that cooperates with the tripping component; and the latch cooperates with the tripping component by using the tripping part.

6. The rotary switch according to claim 5, wherein a guide face is disposed between the hinged part and the locking part, and a locking face is disposed on a side, of the locking part, away from the guide face.

7. The rotary switch according to claim 5, wherein the energy storage component further comprises a second elastic part connecting, to the latch, so that the latch locks the energy storage spring.

8. The rotary switch according to claim 2, wherein the on-off apparatus comprises a mounting housing, and a moving contact component, a fixed contact component, and a shaft coupler disposed in the mounting housing; and the moving contact component is connected to the rotating base through the shaft coupler, so that the rotating base drives the moving contact component to be in contact with or separate from the fixed contact component.

9. The rotary switch according to claim 2, wherein a knob is disposed on the rotating shaft, and the knob is located on an end, of the rotating shaft, away from the drive part.

10. The rotary switch according to claim 1, wherein the tripping component comprises a housing and a trip unit disposed in the housing, wherein the housing is connected to the operating mechanism, and wherein a reset button is further disposed on the housing, to reset the trip unit after the latch unlocks the energy storage spring.

11. A rotary switch comprising:

an operating mechanism;

an on-off apparatus;

a tripping component;

wherein the operating mechanism comprises an energy storage component and a drive component, wherein the drive component is separately in driving connection with the energy storage component and the on-off apparatus; and the energy storage component comprises a latch and an energy storage spring that cooperates with the latch, wherein the energy storage spring is separately connected to the latch and the drive component in a snap-fit manner, the drive component is rotated, so that the energy storage component stores energy, and the drive component drives the on-off apparatus to be switched on, wherein the latch cooperates with the tripping component, so that the latch locks or unlocks the energy storage spring, and wherein based on the energy storage spring being unlocked, the energy storage spring drives the drive component to rotate to a switch-off position of the on-off apparatus.

12. The rotary switch according to claim 11, wherein the operating mechanism further comprises an upper cover and a mounting base connected to the upper cover; the drive component comprises a rotating shaft and a drive part connected to the rotating shaft;

a mounting slot is disposed in the mounting base;

a rotating base is disposed in the mounting slot, the rotating base is connected to the on-off apparatus, and a first elastic part is disposed in the rotating base; and based on rotation of the rotating shaft, the rotating base is driven to rotate by using the first elastic part, to switch off or switch on the on-off apparatus.

13. The rotary switch according to claim 12, wherein a first push part and a second push part are disposed on the drive part;

the rotating base comprises a rotating base body, and a first pawl and a second pawl disposed on the rotating base body, wherein the first pawl and the second pawl are disposed opposite each other, and there is a preset space between an end face of the first pawl and an end face of the second pawl; and a first locking protrusion and a second locking protrusion are disposed on the upper cover at a corresponding interval, and both the first locking protrusion and the second locking protrusion are configured to be clamped in the preset space, wherein there is a first gap between the first pawl and the rotating base body, and there is a second gap between the second pawl and the rotating base body, wherein the first push part is capable of abutting against the first pawl, so that the first pawl retracts towards the first gap, to be released from locking of the first locking protrusion, and wherein the second push part is capable of abutting against the second pawl, so that the second pawl retracts towards the second gap to be released from locking of the second locking protrusion.

14. The rotary switch according to claim 13, wherein a first protrusion is further disposed on the drive part, a stopper is further disposed in the rotating base, and the first elastic part comprises an elastic body, and a first end part and a second end part separately connected to the elastic body; and the first end part abuts against the first protrusion, and the second end part abuts against the stopper.

15. The rotary switch according to claim 13, wherein a knob is disposed on the rotating shaft, and the knob is located on an end, of the rotating shaft, away from the drive part.

16. The rotary switch according to claim 12, wherein the energy storage spring comprises an energy storage spring body, and a first torsion arm and a second torsion arm separately connected to the energy storage spring body, and a second protrusion is further disposed on the drive part;

the first torsion arm is connected to the upper cover in a snap-fit manner, and the second torsion arm abuts against the second protrusion; and the latch comprises a hinged part hinged with the upper cover, a locking part for locking the second torsion arm, and a tripping part that cooperates with the tripping component; and the latch cooperates with the tripping component by using the tripping part.

17. The rotary switch according to claim 16, wherein a guide face is disposed between the hinged part and the locking part, and a locking face is disposed on a side, of the locking part, away from the guide face.

18. The rotary switch according to claim 16, wherein the energy storage component further comprises a second elastic part connecting to the latch, so that the latch locks the energy storage spring.

19. The rotary switch according to claim 12, wherein the on-off apparatus comprises a mounting housing, and a moving contact component, a fixed contact component, and a shaft coupler disposed in the mounting housing; and the moving contact component is connected to the rotating base through the shaft coupler, so that the rotating base drives the moving contact component to be in contact with or separate from the fixed contact component.

20. The rotary switch according to claim 11, wherein the tripping component comprises a housing and a trip unit disposed in the housing, wherein the housing is connected to the operating mechanism, and wherein a reset button is further disposed on the housing to reset the trip unit after the latch unlocks the energy storage spring.

* * * * *